(12) United States Patent
Asakura et al.

(10) Patent No.: US 11,945,281 B2
(45) Date of Patent: Apr. 2, 2024

(54) VEHICLE FRONT-ARRANGEMENT STRUCTURE AND VEHICLE EQUIPPED WITH VEHICLE FRONT-ARRANGEMENT STRUCTURE

(71) Applicant: Nissan Motor Co., Ltd., Yokohama (JP)

(72) Inventors: Daisuke Asakura, Kanagawa (JP); Alain Fouquiau, Boulogne-Billancourt (FR)

(73) Assignee: Nissan Motor Co., Ltd., Yokohama (JP)

( * ) Notice: Subject to any disclaimer, the term of this patent is extended or adjusted under 35 U.S.C. 154(b) by 616 days.

(21) Appl. No.: 16/982,079

(22) PCT Filed: Apr. 12, 2018

(86) PCT No.: PCT/IB2018/000538
§ 371 (c)(1),
(2) Date: Sep. 18, 2020

(87) PCT Pub. No.: WO2019/197857
PCT Pub. Date: Oct. 17, 2019

(65) Prior Publication Data
US 2021/0107331 A1    Apr. 15, 2021

(51) Int. Cl.
*B60H 1/00*    (2006.01)
*B60R 16/033*    (2006.01)

(52) U.S. Cl.
CPC ..... *B60H 1/00507* (2013.01); *B60H 1/00464* (2013.01); *B60R 16/033* (2013.01)

(58) Field of Classification Search
CPC ............ B60H 1/00507; B60H 1/00464; B60H 1/00207; B60H 1/00392; B60H 2001/00214; B60R 16/033; B60K 2001/001; B60K 1/04; B60K 1/00; B60Y 2200/91

See application file for complete search history.

(56) References Cited

U.S. PATENT DOCUMENTS

| 9,187,050 | B2 | 11/2015 | Tanigaki et al. | |
| 2004/0232672 | A1* | 11/2004 | Bandoh ................. | B60N 2/793 280/735 |

(Continued)

FOREIGN PATENT DOCUMENTS

| DE | 11 2006 000 178 T5 | 12/2007 |
| JP | 2014-144668 A | 8/2014 |

(Continued)

*Primary Examiner* — Emmanuel E Duke
(74) *Attorney, Agent, or Firm* — Global IP Counselors, LLP (57) ABSTRACT

A vehicle front arrangement structure includes high-voltage equipment, air conditioning equipment that includes an air-conditioner blower, and a high-voltage connector part. The high-voltage equipment and air conditioning equipment are arranged in front of a vehicle. The high-voltage connector part is provided at a vehicle rearward end portion of the high-voltage equipment to connect a high-voltage wire harness. The high-voltage connector part is arranged so as to be displaced in at least one of a vertical direction and a horizontal direction as viewed from the front of the vehicle.

5 Claims, 7 Drawing Sheets

(56) References Cited

U.S. PATENT DOCUMENTS

| | | | |
|---|---|---|---|
| 2005/0032404 A1* | 2/2005 | Furuta | H01R 13/641 439/157 |
| 2007/0292752 A1 | 12/2007 | Tsuchiya | |
| 2013/0237138 A1* | 9/2013 | Matsuda | B60L 3/0046 454/141 |
| 2017/0087972 A1 | 3/2017 | Hara et al. | |
| 2018/0370384 A1* | 12/2018 | Murakami | B60L 58/21 |

FOREIGN PATENT DOCUMENTS

| | | | | |
|---|---|---|---|---|
| KR | 20140050159 A | * | 4/2014 | B60K 1/00 |
| WO | 2014/045754 A1 | | 3/2014 | |
| WO | WO-2014045754 A1 | * | 3/2014 | B60K 1/04 |

* cited by examiner

VEHICLE FRONT-ARRANGEMENT STRUCTURE AND VEHICLE EQUIPPED WITH VEHICLE FRONT-ARRANGEMENT STRUCTURE

CROSS-REFERENCE TO RELATED APPLICATIONS

This application is a U.S. national stage application of International Application No. PCT/IB2018/000538, filed on Apr. 12, 2018.

BACKGROUND

Technical Field

The present invention relates to a vehicle front arrangement structure and a vehicle equipped with the vehicle front arrangement structure.

Background Information

JP2014-144668A proposes a vehicle front arrangement structure in which an inverter and a water-refrigerant heat exchanger are arranged in close proximity to each other, in the following order from the front of the vehicle: an electric compressor, the inverter, and the water-refrigerant heat exchanger. By means of this structure, in the event of a front end collision, the electric compressor located in the front is destroyed first, and the load input to the inverter, which is a high-voltage part, is suppressed, so that the electrical insulation protection can be enhanced.

SUMMARY

There are cases in which a high-strength air-conditioner blower (blower motor) is provided integrally with heat exchangers at the front of the vehicle. In such cases, depending on the position in which the blower motor is arranged, there is a possibility that the blower motor will come into contact with high-voltage equipment arranged in its vicinity, such as the high-voltage wire harness, due to the load at the time of vehicle collision. For this reason, further improvements to the vehicle front arrangement structure are desired from the standpoint of ensuring more enhanced electrical insulation protection.

Therefore, an object of the present invention is to provide a vehicle front arrangement structure and a vehicle equipped with the vehicle front arrangement structure that can ensure more enhanced electrical insulation protection.

According to one aspect of the present invention, there is provided a vehicle front arrangement structure comprising high-voltage equipment and air conditioning equipment that includes an air-conditioner blower are arranged at the front of a vehicle. In this vehicle front arrangement structure, a high-voltage connector part, to which the high-voltage wire harness is connected, is provided at the vehicle rearward end portion of the high-voltage equipment. Then, the high-voltage connector part is arranged so as to be displaced in at least one of a vertical direction and a horizontal direction with respect to a blower motor, as viewed from the front of the vehicle.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below, with reference to the drawings.

First Embodiment

A vehicle front arrangement structure 10 according to a first embodiment of the present invention will be described below with reference to FIGS. 1 to 3. For the sake of simplification of the description, the "vehicle front," "vehicle rear," "vehicle right direction," "vehicle left direction," "vehicle up direction," and "vehicle down direction" have been shortened and refer to the "front," "rear," "rightward," "leftward," "upward," and "downward," respectively, as appropriate.

The vehicle front arrangement structure 10 according to the present embodiment is installed in front of a vehicle cabin in a vehicle such as an EV (Electric Vehicle), a PHEV (Plug-in Hybrid Electric Vehicle), an HEV (Hybrid Electric Vehicle), or the like.

Figure 1:
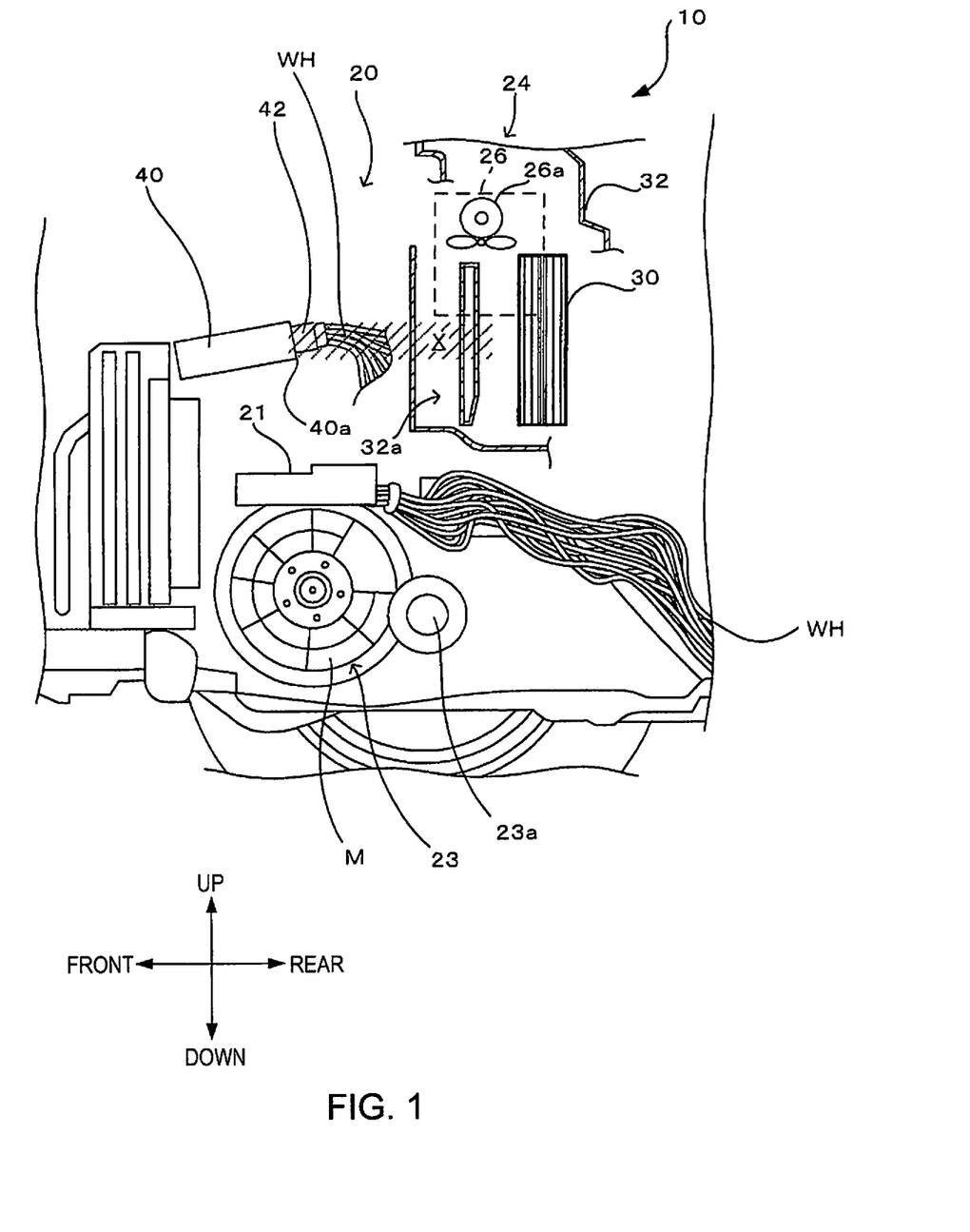
FIG. 1 is a diagram schematically illustrating a partial cross-sectional structure of a vehicle front arrangement structure according to a first embodiment of the present invention.
Figure 2:
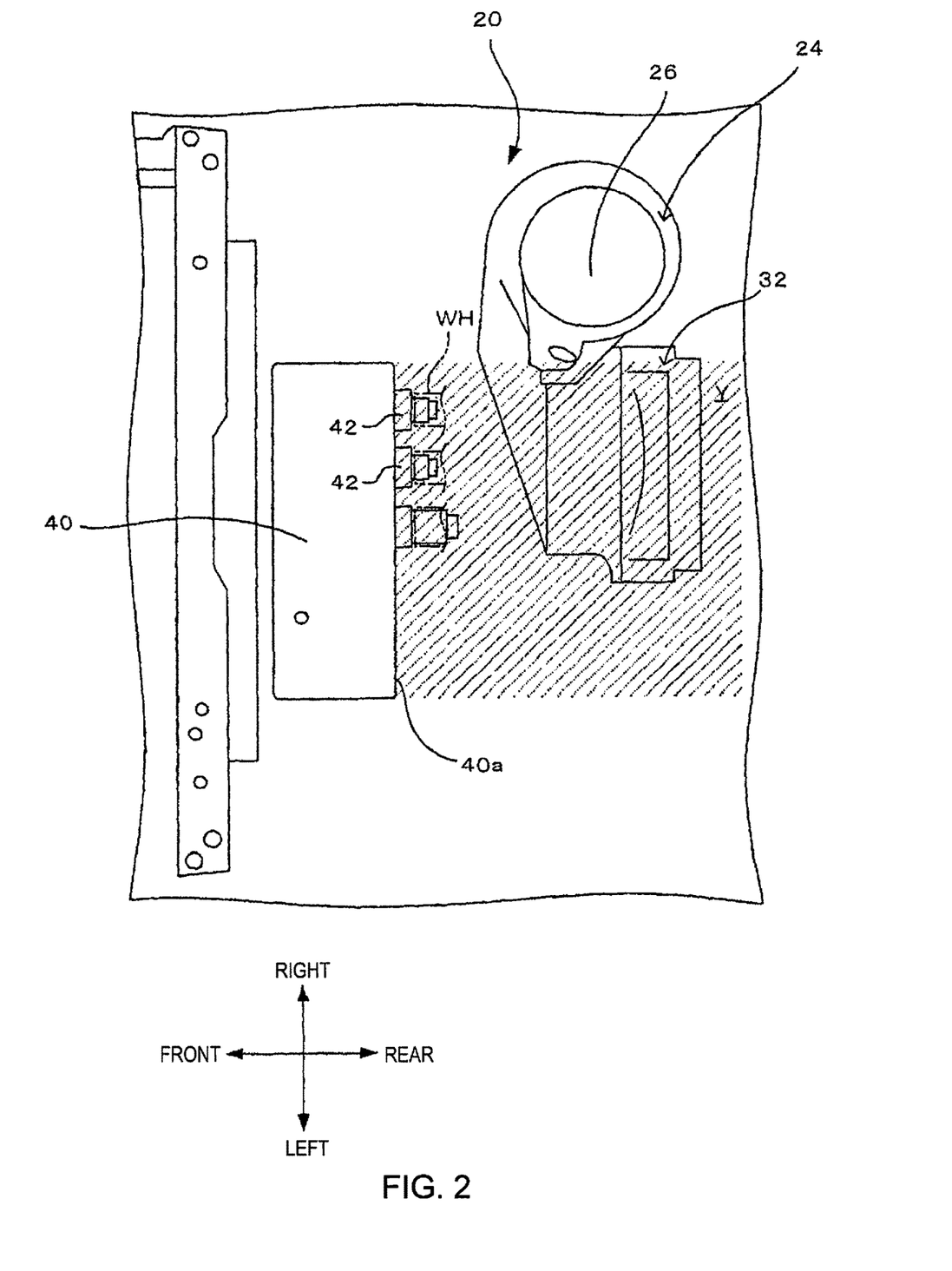
FIG. 2 is a plan view of the main parts of the vehicle front arrangement structure according to the first embodiment.

FIG. 1 is side sectional view of main parts of the vehicle front arrangement structure 10, and FIG. 2 is a plan view of the main parts of the vehicle front arrangement structure 10. As shown, the vehicle front arrangement structure 10 according to the present embodiment includes a motor room 20, and a high-voltage junction box 40 as a first housing arranged in front of the motor room 20.

The motor room 20 houses an inverter case 21, a motor unit 23, and air conditioning equipment 24.

The inverter case 21 houses the inverter that drives a travel motor M. The inverter case 21 is arranged above the travel motor M.

The motor unit 23 includes the travel motor M and a power transmission mechanism, such as an axle shaft 23a. The motor unit 23 is disposed below the inverter case 21.

The air conditioning equipment 24 includes a blower motor 26 that serves as an air-conditioner blower, a heat exchanger 30, and a resin casing 32 that serves as a resin structure that houses the heat exchanger 30 and a blower impeller 26a of the blower motor 26.

The blower motor 26 blows air to the heat exchanger 30 by driving the blower impeller 26a. The heat exchanger 30 is composed of a low temperature-side heat exchanger and a high temperature-side heat exchanger, and exchanges heat between air sent from the blower impeller 26a and a refrigerant sent from a compressor (not shown).

A duct portion 32a that serves as a passage for supplying air from the blower impeller 26a to the travel motor M and the vehicle cabin interior following heat exchange is formed in the resin casing 32. The duct portion 32a is disposed behind the high-voltage junction box 40 at essentially the same height (refer to FIG. 1) and in a position that overlying the high-voltage junction box 40 in the left-right direction (refer to FIG. 2).

The high-voltage junction box 40 is disposed above the inverter case 21 (refer to FIG. 1). In addition, the arrangement position of the high-voltage junction box 40 is set to be in front of the air conditioning equipment 24 and at essentially the same height as the duct portion 32a of the air conditioning equipment 24. That is, the high-voltage junction box 40 disposed below the blower motor 26 at a position displaced leftward relative to the blower motor 26 (rightward as viewed from the front of the vehicle). The high-voltage junction box 40 of the present embodiment is essentially rectangular and slopes downward toward the front.

In addition, an end portion 40a at the rear of the high-voltage junction box 40 is provided with high-voltage connector parts 42 for connecting high-voltage wire harness WH, which is connected to each of the high-voltage elements of the vehicle.

Figure 3:
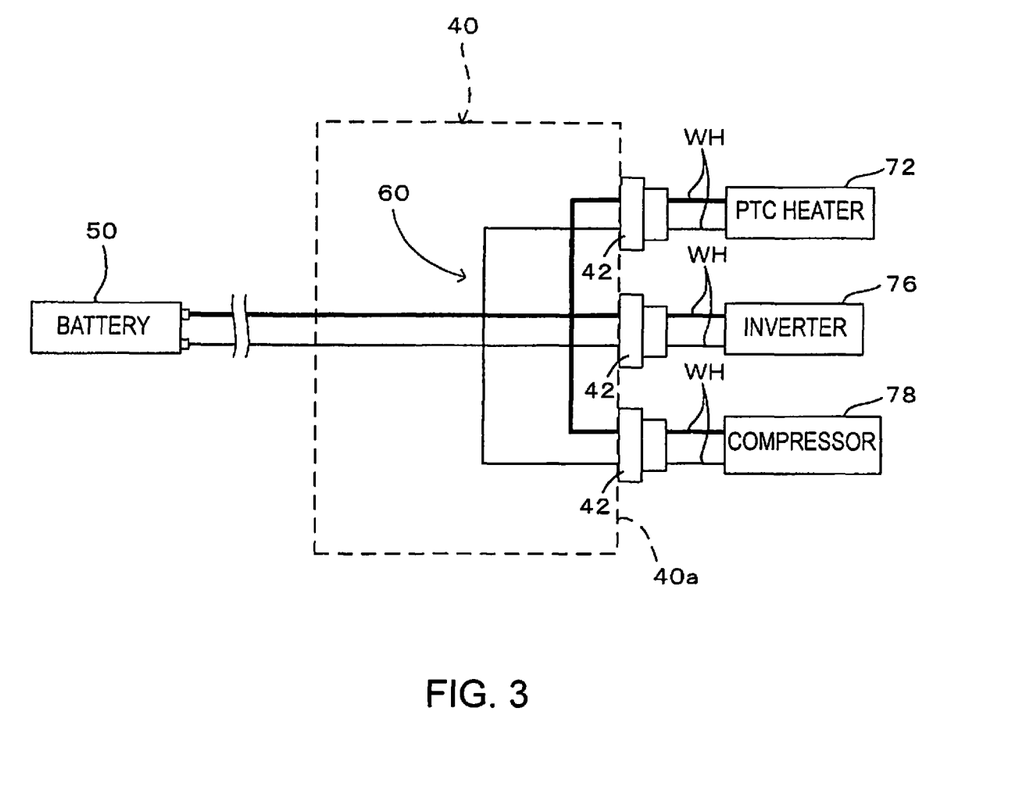
FIG. 3 is a diagram for explaining wired connections of a high-voltage connector part.

FIG. 3 is a diagram for explaining the configuration of the high-voltage junction box 40.

As shown in the figure, the high-voltage junction box 40 includes a relay wiring section 60 as a high-voltage section that branches from a vehicle-mounted high-voltage battery 50 to the high-voltage wire harness WH that is connected to the various high-voltage pieces of equipment such as a PTC heater 72, an inverter 76 housed in the inverter case 21, and an electrically driven air compressor 78. That is, the relay wiring section 60 is connected to the high-voltage wire harness WH via each of the high-voltage connector parts 42 provided at the rear end portion 40a of the high-voltage junction box 40.

Therefore, in the vehicle front arrangement structure 10 according to the present embodiment, the high-voltage connector parts 42 and the high-voltage wire harness WH are located to be displaceable in both in the vertical direction and the horizontal direction with respect to the blower motor 26, which is the high-strength (highly rigid) portion of the air conditioning equipment 24. More specifically, the area around the high-voltage connector parts 42 and the region where the high-voltage wire harness WH is connected to the high-voltage connector parts 42 are disposed at essentially the same height as the duct portion 32a formed on the resin casing 32 of the air conditioning equipment 24 and lie above the aforementioned duct portion in the left-right direction.

The above-described mode of arrangement of the vehicle front arrangement structure 10 according to the present embodiment will be described in more detail.

In the vehicle front arrangement structure 10, the high-voltage junction box 40 and the high-voltage connector part 42 are arranged in positions downwardly offset with respect to the blower motor 26, as viewed from the front of the vehicle (refer to FIG. 1).

More specifically, the vehicle front arrangement structure 10 employs an arrangement configuration in which the high-strength blower motor 26 is not included in a rearward projection area X (hatch-marked area in FIG. 1) of a vertically extended region of the end portion 40a of the high-voltage junction box 40.

As a result, at the time of a front-end collision of the vehicle, even if the high-voltage junction box 40 and the high-voltage connector part 42 become displaced rearwardly into the projection area X due to the front-to-rear impact load, contact between the high-strength blower motor 26 and the high-voltage equipment parts, which include the high-voltage junction box 40, the high-voltage connector part 42, and the region where the high-voltage wire harness WH connects to the high-voltage connector part 42, can be suitably suppressed.

As described above, in the vehicle front arrangement structure 10 of the present embodiment, the high-voltage junction box 40 is disposed at a slight angle of inclination with respect to the horizontal. Thus, in consideration of this slight angle of inclination, in addition to the above-described projection area X, a region into which the high-voltage junction box 40 or the high-voltage connector part 42 could become displaced at the time of a front-end collision can be assumed to be in the upper portion of the projection area X, and the mode of arrangement may be such that the blower motor 26 is not included in this region.

That is, if the high-voltage junction box 40 has an angle of inclination with respect to horizontal, a vertical offset amount (positional deviation amount) of the high-voltage junction box 40 with respect to the blower motor 26 can be adjusted in accordance with the angle of inclination.

In particular, in the aspect of the vehicle front arrangement structure 10 shown in FIG. 1, the high-voltage junction box 40 is also arranged to be inclined. In contrast, in the vehicle front arrangement structure 10, the amount of offset described above is set to the extent possible to prevent the high-voltage equipment from colliding with the blower motor 26 at the time of a front-end collision.

Moreover, in the vehicle front arrangement structure 10, the high-voltage junction box 40 and the high-voltage connector part 42 are arranged in a leftward offset position (rightward, as viewed from the front of the vehicle) with respect to the blower motor 26 (refer to FIG. 2).

More specifically, the vehicle front arrangement structure 10 employs an arrangement configuration in which the high-strength blower motor 26 is not included in a rearward projection area Y (hatch-marked area in FIG. 2) of a laterally extended region of the end portion 40a of the high-voltage junction box 40.

As a result, at the time of a front-end collision of the vehicle, even if the high-voltage junction box 40 and the high-voltage connector part 42 become displaced rearwardly into the projection area X due to the front-to-rear impact load, contact between the high-strength blower motor 26 and the high-voltage equipment can be suitably suppressed.

In addition, the vehicle front arrangement structure 10 of the present embodiment employs an arrangement structure in which the high-voltage junction box 40 and the high-voltage connector part 42 are offset with respect to the blower motor 26 in both the left-right direction and the vertical direction as viewed from the front of the vehicle.

It is thereby possible to more effectively prevent contact between the high-voltage equipment and the blower motor 26 at the time of a front-end collision of the vehicle. Therefore, it is possible to prevent damage to the high-voltage equipment at the time of a front-end collision. Therefore, in a vehicle in which the vehicle front arrangement structure 10 is mounted, the insulation protection performance requirements with respect to the high-voltage elements that could generate a voltage that exceeds a prescribed value (for example, 60 V) can be appropriately met.

In particular, the vehicle front arrangement structure 10 of the present embodiment employs a structure in which the high-voltage connector part 42 is disposed so as to lie above the duct portion 32a formed on the resin casing 32 of the air conditioning equipment 24 as viewed from the front of the vehicle.

As a result, even if the high-voltage junction box 40 is displaced rearwardly due to the load at the time of a front-end collision of the vehicle, the high-voltage equipment parts, which include the high-voltage junction box 40, the high-voltage connector part 42, and the region where the high-voltage wire harness WH connects to the high-voltage connector part 42, come into contact with the duct portion 32a of the insulating resin casing 32 in which high-strength members are not disposed.

That is, even in the event of a front-end collision, the high-voltage equipment parts would come into contact with the insulating resin casing 32, so that the insulation performance is more suitably ensured. In addition, the above-described high-voltage equipment parts come into contact with the duct portion 32a, which is a portion of the resin casing 32 with relatively low strength, so that damage to the high-voltage equipment parts can be further suppressed at the time of collision.

The following actions and effects can be achieved by means of the vehicle front arrangement structure 10 according to the present embodiment.

The present embodiment provides a vehicle front arrangement structure 10 in which the high-voltage junction box 40 as a high-voltage equipment part, and air conditioning equipment 24 that includes the blower motor 26 as an air-conditioner blower are arranged at the front of a vehicle. In addition, the high-voltage connector part 42 is provided at a vehicle rearward end portion 40a of the high-voltage junction box 40 for connecting the high-voltage wire harness WH.

Then, the high-voltage connector part 42 displaced with respect to the blower motor 26 in the up and down direction and the left and right direction as viewed from the front of the vehicle.

As a result, the blower motor 26, which has relatively high strength (rigidity) as part of the air conditioning equipment 24, is disposed in a location outside of those regions to which it is assumed that the high-voltage junction box 40 or the high-voltage connector part 42 would be displaced at the time of a front-end collision (projection area X of FIG. 1 and projection area Y of FIG. 2).

Thus, in the event of a front-end collision, contact (collision) between the blower motor 26 and the high-voltage equipment parts, which include the high-voltage junction box 40, the high-voltage connector part 42, and the region where the high-voltage wire harness WH connects to the high-voltage connector part 42, can be suppressed. As a result, it is possible to realize suitable protection of these high-voltage equipment parts at the time of a front-end collision, and to suitably ensure safety standards relating to the insulation performance of the vehicle.

Moreover, the air conditioning equipment 24 of the present embodiment includes the resin casing 32 serving as a resin structure in which is formed the duct portion 32a as an air passage for guiding the blown air generated by the blower motor 26. Then, the high-voltage connector part 42 is disposed so as to overlie the duct portion 32a of the resin casing 32, as viewed from the front of the vehicle.

It is thereby possible to cause the high-voltage equipment parts, which includes the high-voltage connector part 42, to come into contact with the insulating resin casing 32 at the time of a front-end collision of the vehicle. That is, even at the time of a front-end collision, the insulation performance of the high-voltage equipment is more suitably ensured.

Furthermore, since the duct portion 32a of the resin casing 32 is an air passage, hardly any high-strength members are arranged therein. As a result, the duct portion 32a is part of the resin casing 32 which has relatively little strength. Thus, even if the high-voltage equipment were displaced rearwardly at the time of a front-end collision, the high-voltage equipment would come into contact with the low-strength duct portion 32a, so that damage due to the collision of the high-voltage equipment can be more effectively suppressed.

In addition, according to the present embodiment, a vehicle equipped with the vehicle front arrangement structure 10 having the configuration described above is provided. That is, it is possible to provide a vehicle in which the safety standards related to the insulation performance are suitably ensured by means of the vehicle front arrangement structure 10.

Second Embodiment

The second embodiment will be described with reference to FIGS. 4-6. Elements identical to those in the first embodiment have been assigned the same reference numerals, and the descriptions thereof have been omitted.

Figure 4:
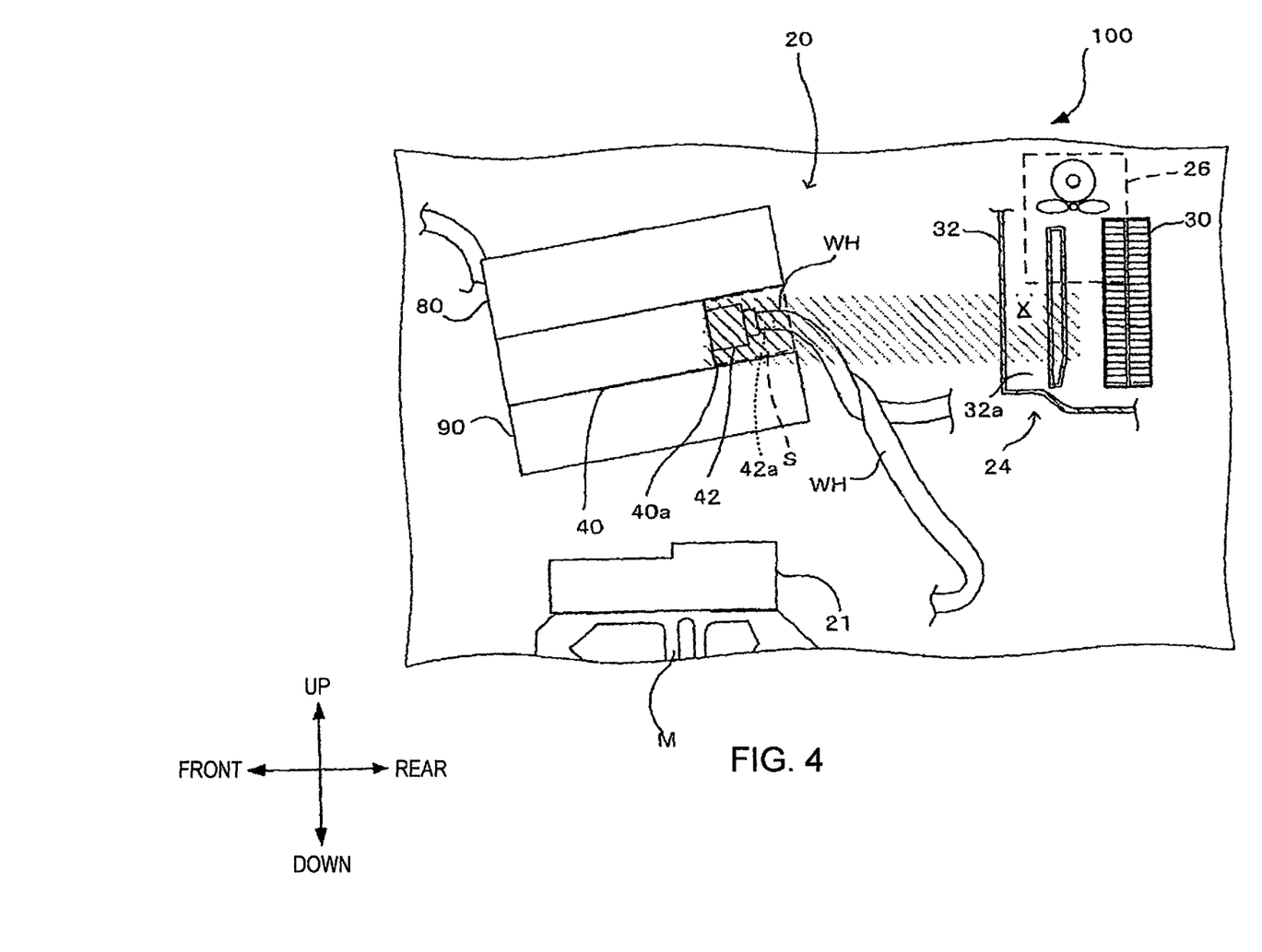
FIG. 4 is a diagram schematically illustrating a partial cross-sectional structure of a vehicle front arrangement structure according to a second embodiment of the present invention.
Figure 5:
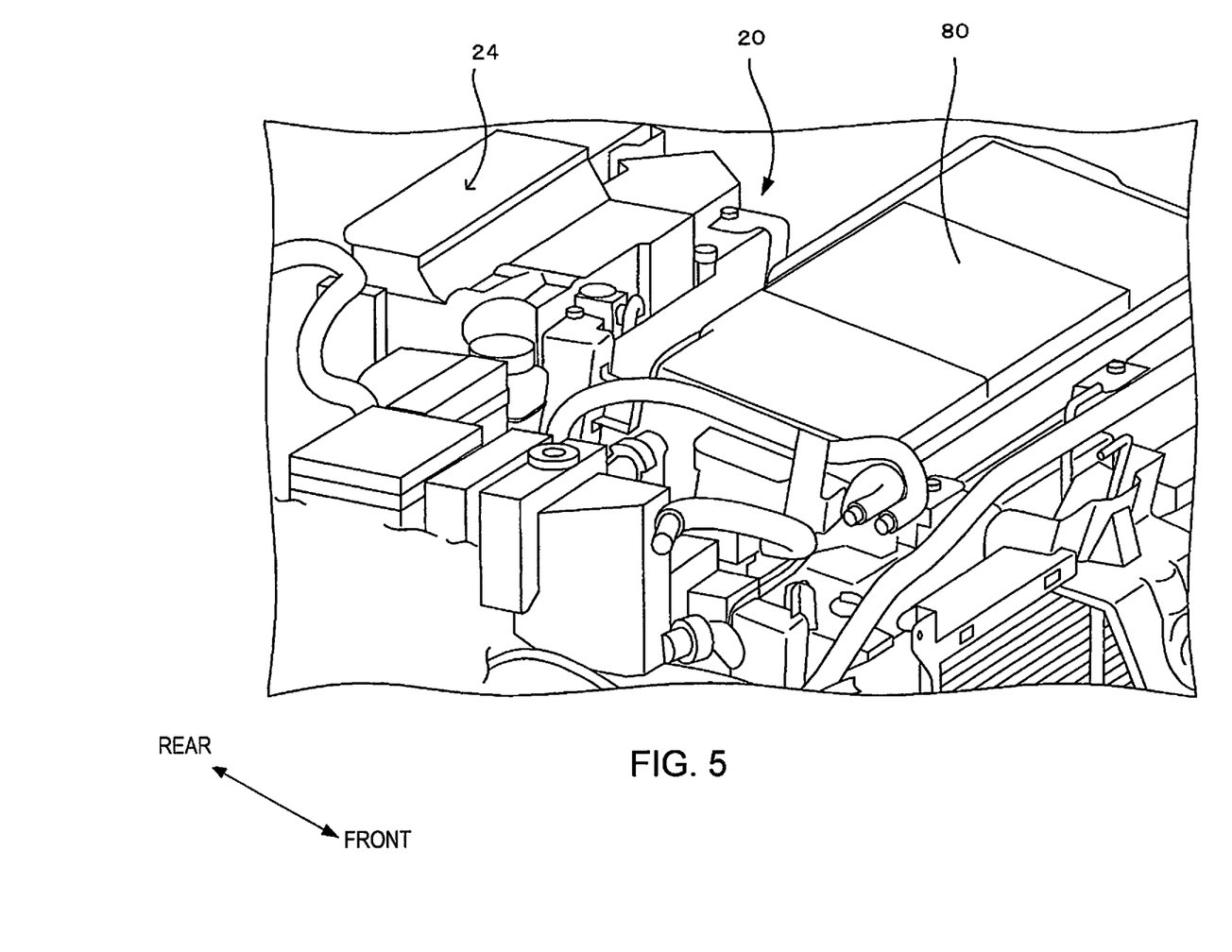
FIG. 5 is a perspective view of the main parts of the vehicle front arrangement structure according to the second embodiment.

FIG. 4 is a side sectional view of the main parts of a vehicle front arrangement structure 100 according to the present embodiment. In addition, FIG. 5 is a perspective view of the main parts of the vehicle front arrangement structure 100.

In the vehicle front arrangement structure 100 according to the present embodiment, an upper protective casing 80, which serves as a second housing, is stacked and arranged above the high-voltage junction box 40. In addition, a lower protective casing 90, which serves as a third housing, is stacked and arranged below the high-voltage junction box 40. That is, the high-voltage junction box 40 is arranged in a state of being interposed from above and below between the upper protective casing 80 and the lower protective casing 90.

Specifically, the upper protective casing 80 according to the present embodiment is a case for housing a charger that executes charging from a charging device outside of the vehicle. The upper protective casing 80 is formed from a high-strength material, such as metal. A structure that enhances the electrical insulation protection, such as a coating of an insulating material, may be applied separately to the upper protective casing 80.

In addition, the lower protective casing 90 according to the present embodiment is a case for housing a DC/DC converter that appropriately adjusts the DC power that is supplied from the battery to the travel motor M or various auxiliary machines. The lower protective casing 90 is formed from a high-strength material, such as metal. A structure that enhances the electrical insulation protection, such as a coating of an insulating material, may be applied separately to the lower protective casing 90.

In the present embodiment, the upper protective casing 80 and the lower protective casing 90 are disposed at substantially the same inclination as that of the high-voltage junction box 40. Therefore, in the vehicle front arrangement structure 100 according to the present embodiment, the high-voltage junction box 40, the upper protective casing 80, and the lower protective casing 90 are arranged essentially parallel to each other at substantially the same inclination.

Figure 6:
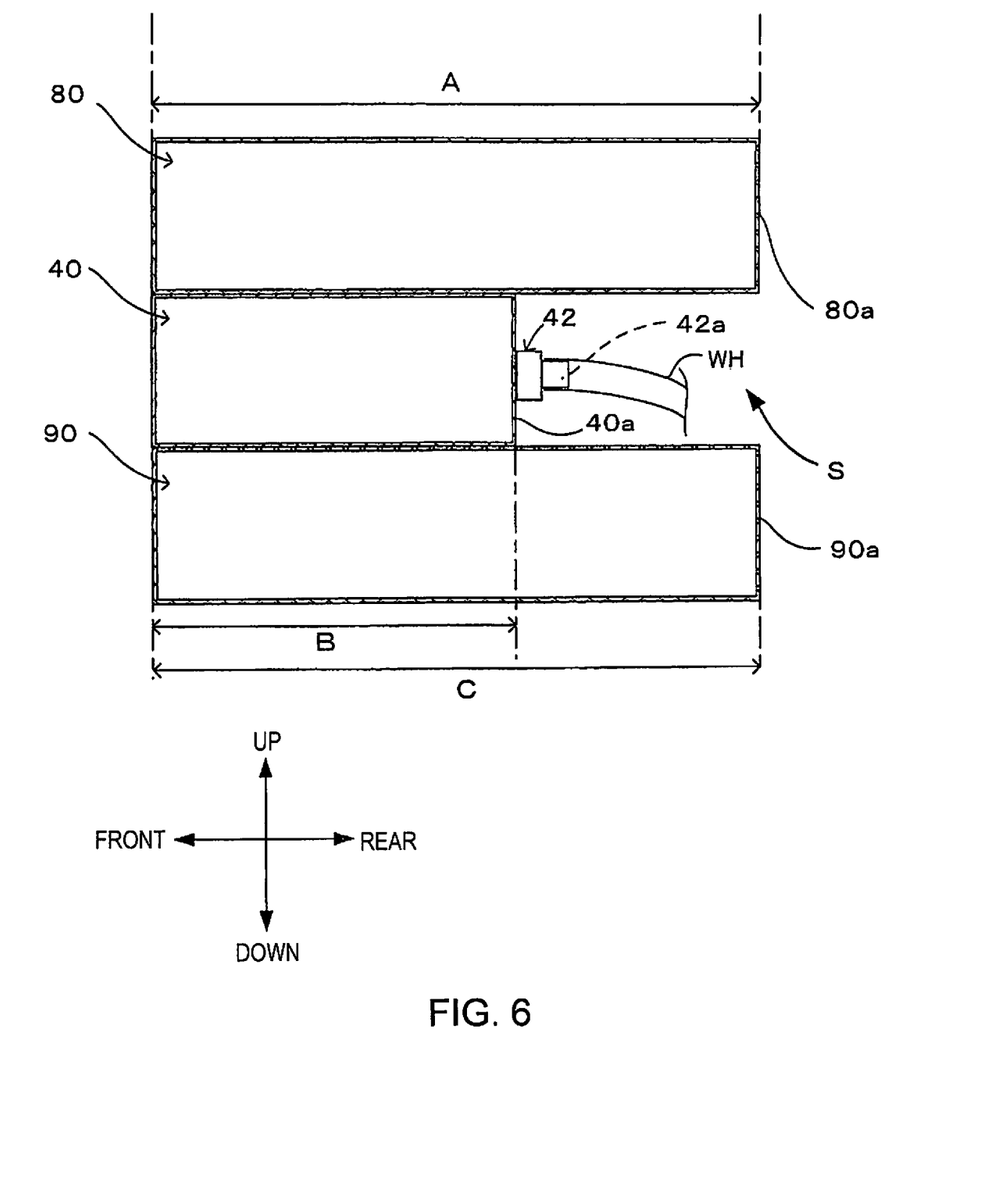
FIG. 6 is a diagram for explaining the relationship between the relative lengths of a first housing, a second housing, and a third housing in the front-rear direction of the vehicle.

FIG. 6 is a diagram for explaining the relationship between the relative lengths of the high-voltage junction box 40, the upper protective casing 80, and the lower protective casing 90 in the front-rear direction of the vehicle. For the sake of simplification of the diagram and the explanation, the front-rear direction of each box is made to coincide with the front-rear direction of the vehicle. The arrangement structure is such that an essentially rectangular (rectangular parallelepiped) space S is ensured in the portion of the high-voltage connector part 42 behind the high-voltage junction box 40.

As shown, the upper protective casing 80 according to the present embodiment extends from the rearward end portion 40a of the high-voltage junction box 40 to a region behind a distal end portion 42a of the high-voltage connector part 42. As a result, a rearward end portion 80a of the upper protective casing 80 projects farther rearward than the high-voltage connector part 42. That is, the front-rear length A of the upper protective casing 80 is longer than the front-rear-length B of the high-voltage junction box 40.

In addition, the lower protective casing 90 also extends from the rearward end portion 40a of the high-voltage junction box 40 to a region behind the distal end portion 42a of the high-voltage connector part 42. As a result, a rearward end portion 90a of the lower protective casing 90 projects farther rearward than the high-voltage connector part 42. That is, the front-rear length C of the lower protective casing 90 is also longer than the front-rear length B of the high-voltage junction box 40.

With this configuration, the upper protective casing 80 and the lower protective casing 90 extend into a region farther rearward than the distal end portion 42a of the high-voltage connector part 42 and the portion where the high-voltage wire harness WH and the high-voltage connector part 42 are connected. In particular, in the present embodiment, the upper protective casing 80 and the lower protective casing 90 are configured such that the front-rear length A and the front-rear length C are the same.

Therefore, in the vehicle front arrangement structure 100 that has the configuration described above, the space S is formed between the upper protective casing 80 and the lower protective casing 90, behind a rear end portion 42b of the high-voltage connector part 42; thus, the high-voltage connector part 42 is disposed in the space S.

In addition, as described above, in the vehicle front arrangement structure 100 according to the present embodiment, the upper protective casing 80 and the lower protective casing 90 extend into a region farther rearward than the high-voltage connector part 42 and the connecting portion where the high-voltage wire harness WH is connected. Accordingly, as a result of the front-to-rear impact load that is applied at the time of a front-end collision of the vehicle, at least the upper protective casing 80 and the lower protective casing 90 come into contact with the air conditioning equipment 24 before the high-voltage connector part 42 and the connecting portion where the high-voltage wire harness WH is connected. As a result, at the time of a front-end collision, by means of the upper protective casing 80 and the lower protective casing 90, it is possible to mitigate the impact to, and thereby protect, the high-voltage equipment parts that include the high-voltage connector part 42 and the connecting portion where the high-voltage wire harness WH is connected. That is, these relatively fragile high-voltage elements that are disposed in the space S without coverage of a casing can be protected by utilization of the relatively high-strength upper protective casing 80 and the lower protective casing 90.

In addition, in the present embodiment, the upper protective casing 80 and the lower protective casing 90, the front-rear lengths of which are the same, are disposed with a downward slope toward the front, so that the rearward end portion 90a of the lower protective casing 90 is positioned relatively closer to the air conditioning equipment 24. Therefore, the lower protective casing 90 collides first with the air conditioning equipment 24 as a result of the front-to-rear impact load at the time of a front-end collision. Then, when the lower protective casing 90 is crushed and deforms due to the collision, the rearward end portion 80a of the upper protective casing 80, which extends into a region farther rearward than the distal end portion 42a of the high-voltage connector part 42, collides next with the air conditioning equipment 24.

As a result, the high-voltage elements are suitably protected by means of a two-stage buffering action of the lower protective casing 90 and the upper protective casing 80 against the impact load at the time of the front-end collision. As a result, it is possible to further enhance the protective function with respect to the high-voltage elements at the time of a front-end collision.

Furthermore, in the vehicle front arrangement structure 100 according to the present embodiment, the positions of the high-voltage junction box 40 and the high-voltage connector part 42 are displaced both downwardly and to the right with respect to the blower motor 26, as viewed from the front of the vehicle, in the same manner as in the first embodiment. In addition, the high-voltage connector part 42 is disposed to overlie the duct portion 32a of the resin casing 32 in the air conditioning equipment 24 as viewed from the front of the vehicle.

Moreover, the upper protective casing 80 is disposed above the high-voltage junction box 40 and the lower protective casing 90 is disposed below the high-voltage junction box 40, thereby sandwiching the high-voltage junction box 40.

As a result, even if an impact load is applied to the high-voltage junction box 40 at the time of a front-end collision, between the upper protective casing 80 and the lower protective casing 90. Therefore, contact of the high-voltage connector part 42 and the high-voltage wire harness WH with other components can be minimized at the time of a front-end collision.

The strength of the upper protective casing 80 and the strength of the lower protective casing 90 may be configured differently. For example, the strength of the upper protective casing 80, which is likely to come into contact with the high-strength portion (blower motor 26) of the air conditioning equipment 24 at the time of a front-end collision may be relatively increased, while the rigidity of the lower protective casing 90, which comes into contact with the low-strength portion (duct portion 32a) of the air conditioning equipment 24, may be made relatively lower.

As a result, it is possible to employ a configuration such that, at the time of a front-end collision, the lower protective casing 90, which comes in contact with the duct portion 32a, is relatively easily crushed and deformed, while the upper protective casing 80 receives the reaction force from the blower motor 26 of the air conditioning equipment 24. Therefore, at the time of a collision, the upper protective casing 80 is pushed back by the blower motor 26 and a moment is generated to rotate the lower protective casing 90 and the high-voltage connector part 42 upward in the counterclockwise direction. Thus, it is possible to guide the high-voltage connector part 42 and the connecting portion where the high-voltage wire harness WH is connected in a direction away from the blower motor 26, while further increasing the area of contact between the lower protective casing 90 and the duct portion 32a. As a result, it is possible to further improve the electrical insulation protection performance at the time of a collision.

The following actions and effects can be achieved by means of the vehicle front arrangement structure 100 according to the present embodiment.

In the vehicle front arrangement structure 100 according to the present embodiment, the high-voltage equipment includes the relay wiring section 60, which serves as a high-voltage section, and the high-voltage junction box 40, which serves as a first housing that houses the relay wiring section 60 and the high-voltage connector part 42 that is provided at the vehicle rearward end portion 40a of the first housing. In addition, the upper protective casing 80, which serves as a second housing is also arranged extending into a region farther rearward than the vehicle rearward end portion 40a of the high-voltage junction box 40.

As a result, even if the high-voltage junction box 40 is displaced due to the load at the time of a front-end collision, the upper protective casing 80 can be made to come in contact with the air conditioning equipment 24 before the high-voltage junction box 40. Thus, it is possible to preferentially protect the high-voltage junction box 40 at the time of a front-end collision.

Furthermore, in the vehicle front arrangement structure 100 according to the present embodiment, the lower protective casing 90, which serves as a third housing, is further disposed to extend into a region farther rearward than the vehicle rearward end portion 40a of the high-voltage junction box 40. The upper protective casing 80 is stacked above the high-voltage junction box 40. The lower protective casing 90 is stacked below the high-voltage junction box 40.

As a result, at the time of a front-end collision, the upper protective casing 80 and the lower protective casing 90 can be made to come in contact with the air conditioning equipment 24 before the high-voltage connector part 42 provided in the high-voltage junction box 40. Therefore, at the time of a front-end collision, it becomes possible to preferentially protect the relatively low-strength high-voltage elements, which are composed of the high-voltage connector part 42 and the region where the high-voltage wire harness WH connects to the high-voltage connector part 42, by means of the buffering effect of the colliding of the air conditioning equipment 24 with the relatively high-strength upper protective casing 80 and lower protective casing 90. As a result, it is possible to further enhance the insulation performance at the time of a front-end collision.

Further, in the present embodiment, because the high-voltage junction box 40 is interposed from above and below between the upper protective casing 80 and the lower protective casing 90, even if an input load is generated in the high-voltage junction box 40 at the time of a front-end collision, the orientation of the high-voltage junction box 40 can be suitably maintained. Therefore, it is possible to prevent a situation in which, due to the collapsed orientation of the high-voltage junction box 40 (rotation in the front-rear direction and/or right-left direction), the high-voltage connector part 42 and the high-voltage wire harness WH to which it is connected come in contact with and damage other components, and thus the electrical insulation protection at the time of a front-end collision can be further enhanced.

In particular, the upper protective casing 80 and the lower protective casing 90 according to the present embodiment extend into a region farther rearward than the high-voltage connector part 42.

As a result, even if the high-voltage connector part 42 is displaced toward the rear of the vehicle due to the load at the time of a front-end collision, the upper protective casing 80 and the lower protective casing 90 can be made more reliably to come into contact with the air conditioning equipment 24 before the high-voltage connector part 42. Thus, it is possible to more suitably protect the high-voltage connector part 42 and the region where the high-voltage wire harness WH connects to the high-voltage connector part 42.

Then, according to the present embodiment, a vehicle equipped with the vehicle front arrangement structure 100 having the configuration described above is provided. That is, in the present embodiment, more suitable protection is realized for the relatively low-strength high-voltage elements, which are composed of the high-voltage connector part 42 and the region where the high-voltage wire harness WH connects to the high-voltage connector part 42, and a vehicle with improved electrical insulation protection performance is provided.

Embodiments of the present invention were described above, but the above-described embodiments illustrate only some of the application examples of the present invention, and are not intended to limit the technical scope of the present invention to the specific configurations of the above-described embodiments.

For example, from the standpoint of further improving the ability to protect the high-voltage connector part 42 and the high-voltage wire harness WH at the time of a front-end collision of the vehicle, a reinforcing member, such as a corrugated tube or sheet metal, may be appropriately provided in the high-voltage connector part 42 and the high-voltage wire harness WH, with respect to the configuration of the vehicle front arrangement structure 10 or the vehicle front arrangement structure 100 described in each of the embodiments described above.

In addition, in the vehicle front arrangement structure 10, 100 of the above-described embodiments, a mode of arrangement was described in which the high-voltage connector part 42 is displaced both downwardly and to the right (to the left in FIG. 2) with respect to the blower motor 26, as viewed from the front of the vehicle. However, if the layout of components in the vehicle front structure differs according to vehicle type, etc., a mode of arrangement may be employed in which, for example, the high-voltage connector part 42 is displaced upwardly and to the right with respect to the blower motor 26 as viewed from the front of the vehicle. That is, an arrangement mode in which the high-voltage connector part 42 is displaced to the right or to the left with respect to the blower motor 26, as viewed from the front of the vehicle, and also upwardly or downwardly, as viewed from the front of the vehicle, is also included in the technical scope of the present invention.

Furthermore, a mode of arrangement in which the high-voltage connector part 42 is displaced only in the left and right direction or in the up and down direction with respect to the blower motor 26 as viewed from the front of the vehicle, is also included in the technical scope of the present invention. Even with such a configuration, it is possible to obtain a certain effect from the standpoint of minimizing the contact between the high-voltage connector part 42 and the blower motor 26, in order to enhance the electrical insulation protection.

In addition, both the upper protective casing 80 and the lower protective casing 90 are arranged in the vehicle front arrangement structure 100 according to the second embodiment. However, it is possible to employ a configuration in which only either the upper protective casing 80 or the lower protective casing 90 is provided.

Even with such a configuration, either the upper protective casing 80 or the lower protective casing 90 will comes into contact with the air conditioning equipment 24 before the high-voltage connector part 42 at the time of a front-end collision. Thus, it is possible to obtain the certain effect from the standpoint of minimizing the contact between the high-voltage connector part 42 and the blower motor 26 in order to enhance the electrical insulation protection.

Figure 7:
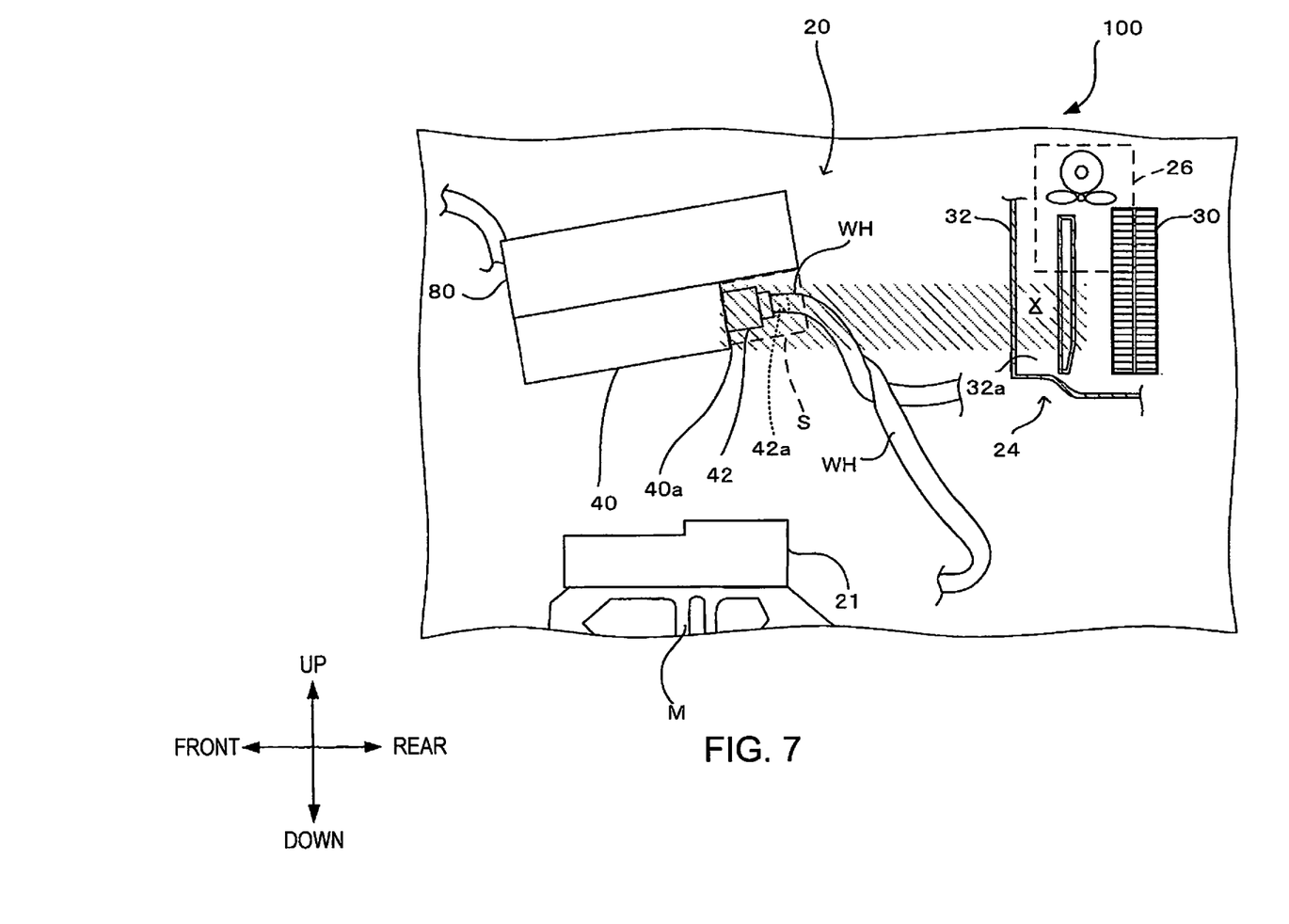
FIG. 7 is a perspective view of the main parts of the vehicle front arrangement structure according to another embodiment.

More specifically, FIG. 7 shows an example in which the upper protective casing 80 is stacked above the high-voltage junction box 40 but the lower protective casing 90 is not disposed. Even with such a structure, the upper protective casing 80 can be made to come in contact with the air conditioning equipment 24 before the high-voltage connector part 42 at the time of a front-end collision. Therefore, it is possible to obtain the certain effect of protecting the high-voltage connector part 42 and the region where the high-voltage wire harness WH connects to the high-voltage connector part 42 at the time of a collision.

In addition to the upper protective casing 80 and the lower protective casing 90 in the vehicle front arrangement structure 100, other casings (boxes) may be arranged in various positions so as to come into contact with the air conditioning equipment 24 or another high-rigidity equipment part before the high-voltage junction box 40 at the time of a collision.

Thus, besides the upper protective casing 80 and the lower protective casing 90, other casings can be made to come in contact with the air conditioning equipment 24 before the high-voltage connector part 42 at the time of a front-end collision. Thus, it is possible to further increase the effect of minimizing the contact between the high-voltage connector part 42 and the blower motor 26 in order further to improve the electrical insulation protection at the time of a front-end collision.

Furthermore, in the second embodiment, a structure in which the upper protective casing 80 and the lower protective casing 90 are stacked above and below the high-voltage junction box 40, respectively, was described. However, the invention is not limited to an arrangement mode in which the high-voltage junction box 40 is sandwiched, as long as the upper protective casing 80 or the lower protective casing 90 can be made to come in contact with the air conditioning equipment 24 before the high-voltage connector part 42. That is, the upper protective casing 80 or the lower protective casing 90 may be disposed in another location in the vehicle front arrangement structure 100.

The invention claimed is:

1. A vehicle front arrangement structure comprising:
    high-voltage equipment and air conditioning equipment that includes an air-conditioner blower are arranged in front of a vehicle, the air conditioning equipment being disposed rearward of the high-voltage equipment, the air conditioning equipment and the high-voltage equipment being housed in a motor room; and
    a high-voltage connector part provided at a vehicle rearward end portion of the high-voltage equipment to connect a high-voltage wire harness; and
    the high-voltage connector part being arranged so as to be displaced with respect to the air-conditioner blower in at least one of a vertical direction and a horizontal direction as viewed from the front of the vehicle,
    the air conditioning equipment including a resin structure in which an air passage is formed for guiding blown air generated by the air-conditioner blower, and
    the high-voltage connector part being disposed so as to overlie the air passage of the resin structure as viewed from the front of the vehicle.

2. The vehicle front arrangement structure according to claim 1, wherein
    the high-voltage equipment includes
    a first housing in which a high-voltage section is provided and in which the high-voltage connector part is provided at a vehicle rearward end portion of the first housing, and
    a second housing that extends farther into a region rearward than the vehicle rearward end portion of the first housing.

3. The vehicle front arrangement structure according to claim 2, further comprises
    a third housing that extends to a region farther rearward than the vehicle rearward end portion of the first housing,
    the second housing being stacked above the first housing, and
    the third housing being stacked below the first housing.

4. The vehicle front arrangement structure according to claim 3, wherein
    at least one of the second housing and the third housing extends into a region farther rearward than the high-voltage connector part.

5. A vehicle equipped with the vehicle front arrangement structure according to claim 1.

* * * * *